United States Patent
Kim et al.

(10) Patent No.: US 9,542,769 B2
(45) Date of Patent: Jan. 10, 2017

(54) APPARATUS AND METHOD OF RECONSTRUCTING 3D CLOTHING MODEL

(71) Applicant: ELECTRONICS AND TELECOMMUNICATIONS RESEARCH INSTITUTE, Daejeon (KR)

(72) Inventors: Tae Joon Kim, Daejeon (KR); Ho Won Kim, Daejeon (KR); Sung Ryull Sohn, Daejeon (KR); Kyu Sung Cho, Suwon-si (KR); Ki Nam Kim, Seoul (KR); Jin Sung Choi, Daejeon (KR); Bon Ki Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/590,321

(22) Filed: Jan. 6, 2015

(65) Prior Publication Data

US 2015/0287242 A1 Oct. 8, 2015

(30) Foreign Application Priority Data

Apr. 3, 2014 (KR) ........................ 10-2014-0040089

(51) Int. Cl.
*G06T 19/00* (2011.01)
*G06T 15/04* (2011.01)
*G06T 17/20* (2006.01)

(52) U.S. Cl.
CPC ............... *G06T 15/04* (2013.01); *G06T 17/20* (2013.01); *G06T 2210/16* (2013.01)

(58) Field of Classification Search
None
See application file for complete search history.

(56) References Cited

U.S. PATENT DOCUMENTS

| | | | |
|---|---|---|---|
| 6,907,310 B2* | 6/2005 | Gardner | A41H 1/00 700/132 |
| 7,039,486 B2* | 5/2006 | Wang | A41H 3/007 33/512 |
| 7,184,047 B1* | 2/2007 | Crampton | G06T 17/00 345/473 |
| 8,165,711 B2 | 4/2012 | Brooking et al. | |
| 8,525,828 B1* | 9/2013 | Bates | G06T 15/00 345/419 |
| 2008/0262944 A1* | 10/2008 | Wu | G06Q 30/0603 705/27.2 |
| 2011/0149074 A1 | 6/2011 | Lee et al. | |

FOREIGN PATENT DOCUMENTS

KR 1019930006430 A 4/1993

* cited by examiner

*Primary Examiner* — Ashish K Thomas
(74) *Attorney, Agent, or Firm* — Ladas & Parry LLP

(57) ABSTRACT

Disclosed are a method and an apparatus for reconstructing three-dimensional (3D) clothing using captured image information on clothing, which capture image information on clothing put on a mannequin, generate a temporary model using the captured image information, and generate a final clothing model using the temporary model.

20 Claims, 5 Drawing Sheets

APPARATUS AND METHOD OF RECONSTRUCTING 3D CLOTHING MODEL

CROSS-REFERENCE TO RELATED APPLICATION

This application claims the priority benefit of Korean Patent Application No. 10-2014-0040089, filed on Apr. 3, 2014, in the Korean Intellectual Property Office, the disclosure of which is incorporated herein by reference.

BACKGROUND

1. Field of the Invention

Embodiments of the present invention relate to an apparatus and method of reconstructing a three-dimensional (3D) clothing model, and more particularly, to an apparatus and method of reconstructing a 3D clothing model which reconstruct an appearance of a 3D model of real clothing and transform into an appropriate form for a simulation using image information on the real clothing.

2. Description of the Related Art

Recent advancement and spread of sensors to measure depth information on images facilitate reconstruction of various shapes of objects into three-dimensional (3D) forms. Here, the objects reconstructed into the 3D forms are provided to users via visualization or simulation through devices and are applicable to various fields.

As a representative application, there is a user-oriented clothing service which provides users with a clothing experience service using virtual 3D clothing. The user-oriented clothing service, which uses virtual 3D clothing, provides various services of enabling a user to try on clothes on-line or customizing clothes.

Here, the user-oriented clothing service provides a cloth simulation controlling movements of virtual 3D clothing corresponding to user movements. The cloth simulation enables a user to see wearing clothing without directly trying on the clothing, and thus mistakes by the user in purchasing clothes may be minimized.

However, the user-oriented clothing service has no method for continuously providing virtual 3D clothes for user experience. In detail, the user-oriented clothing service uses a method of creating clothes using computer graphics authoring tools, such as Autodesk Maya, and a method of making virtual clothing by constructing a virtual 3D model using patterns of real clothing. Here, the method using the authoring tools is a classical method used for making costumes of game or movie characters and involves difficulty in digitalizing real clothing. Also, the method of making the virtual clothing, as in making real clothing, generates virtual patterns based on the patterns, integrates the virtual patterns to produce a 3D model and attaches the 3D model to a virtual character, thereby producing virtual clothing.

Here, clothing with pleats, for example, a female dress, involves a draping process to maintain a smooth shape, which is tricky to automate because a fashion sense is required. Moreover, virtual clothing production has different working environments from real clothing production, making it difficult for a designer to do the job.

Another problem of the method using the pattern occurs when there is no pattern, for example, since clothing is made before a system is applied or clothing is imported. When there is no pattern, pattern data is extracted by scanning clothing put on a mannequin using a 3D scanner so as to obtain a pattern, and digital clothing is made using the extracted pattern. This method, however, needs manual processes by experts for a long time and thus is inappropriate for making clothes.

Manual processes include separating a clothing area from shape data of a 3D mesh configuration of the 3D scanned clothing and lowering complexity of a mesh, removing a hole generated in scanning, generating texture information on the clothing in a form, or the like. To extract a pattern from shape data, a pattern extracting process by an expert through a graphic user interface (GUI) is necessary. To apply the generated form to a virtual clothing experience, parameter setting considering properties of the clothing, such as stretchiness and weightiness of the clothing, and combined parts with an avatar need to be defined. That is, time and a labor-intensive process are necessary to convert current real clothing into clothing for digital experience through 3D scanning.

Accordingly, there is presented a method of automating a digitizing process of real clothing for a virtual clothing fitting service for manufacturers having data on clothing, such as patterns, and distributors having no clothing data, thereby facilitating making digital clothing of the real clothing for experience without expert knowledge.

SUMMARY

An aspect of the present invention provides a 3D clothing model reconstructing method and a 3D clothing model reconstructing apparatus which use image information acquired from real clothing put on a mannequin without any clothing pattern when generating a 3D clothing model to simplify a process of 3D-reconstructing clothing, thereby generating a 3D clothing model using minimized time and costs.

Another aspect of the present invention also provides a 3D clothing model reconstructing method and a 3D clothing model reconstructing apparatus which acquire image information on clothing put on a mannequin disposed on a turntable that rotates at a rotation angle of the turntable, thereby acquiring the image information on the clothing at different angles and minimizing user intervention.

Still another aspect of the present invention also provides a 3D clothing model reconstructing method and a 3D clothing model reconstructing apparatus which automatically extract physical information on clothing to generate a clothing model without any clothing pattern.

According to an aspect of the present invention, there is provided a three-dimensional (3D) clothing model reconstructing method, the method including: capturing image information on clothing put on a mannequin; generating a temporary model including geometry information and texture information on the clothing using the captured image information; and generating a clothing model corresponding to the clothing using the temporary model.

The capturing may capture the image information on the clothing put on the mannequin disposed on a turntable based on a rotation angle of the turntable.

The generating of the temporary model may calculate a 3D spatial position using depth information included in the captured image information and include the geometry information on the clothing in a 3D mesh form corresponding to the calculated position.

The generating of the temporary model may include the texture information mapped with the geometry information on the clothing using color information included in the captured image information.

The generating of the temporary model may generate the temporary model by removing the mannequin from geometry information on the temporary model and by removing lighting information included in the texture information.

The generating of the temporary model may generate the temporary model based on spatial information on the temporary model and mutual position information according to 3D spatial information on the clothing.

The generating of the clothing model may generate the clothing model by hierarchically transforming the temporary model to express a form based on a clothing movement.

The generating of the clothing model may generate the clothing model by reconstructing a texture of the temporary model based on a structural property of the texture for expressing the clothing.

The generating of the clothing model may generate the clothing model by adjusting a size of each part of the mannequin to reflect physical properties including at least one of an allowable body size of the clothing by part and elasticity of the clothing.

The generating of the clothing model may generate the clothing model by simplifying the temporary model by pattern unit in view of preciseness of the temporary model.

According to an aspect of the present invention, there is provided a 3D clothing model reconstructing apparatus, the apparatus including an image information capturing unit to capture image information on clothing put on a mannequin; a temporary model generating unit to generate a temporary model including geometry information and texture information on the clothing using the captured image information; and a clothing model generating unit to generate a clothing model corresponding to the clothing using the temporary model.

The image information capturing unit may capture the image information on the clothing put on the mannequin disposed on a turntable based on a rotation angle of the turntable.

The temporary model generating unit may calculate a 3D spatial position using depth information included in the captured image information and include the geometry information on the clothing in a 3D mesh form corresponding to the calculated position.

The temporary model generating unit may include the texture information mapped with the geometry information on the clothing using color information included in the captured image information.

The temporary model generating unit may generate the temporary model by removing the mannequin from geometry information on the temporary model and by removing lighting information included in the texture information.

The temporary model generating unit may generate the temporary model based on spatial information on the temporary model and mutual position information according to 3D spatial information on the clothing.

The clothing model generating unit may generate the clothing model by hierarchically transforming the temporary model to express a form based on a clothing movement.

The clothing model generating unit may generate the clothing model by reconstructing a texture of the temporary model based on a structural property of the texture for expressing the clothing.

The clothing model generating unit may generate the clothing model by adjusting a size of each part of the mannequin to reflect physical properties including at least one of an allowable body size of the clothing by part and elasticity of the clothing.

The clothing model generating unit may generate the clothing model by simplifying the temporary model by pattern unit in view of preciseness of the temporary model.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the accompanying drawings, however, the present invention is not limited thereto or restricted thereby.

When it is determined a detailed description related to a related known function or configuration that may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

Figure 1:
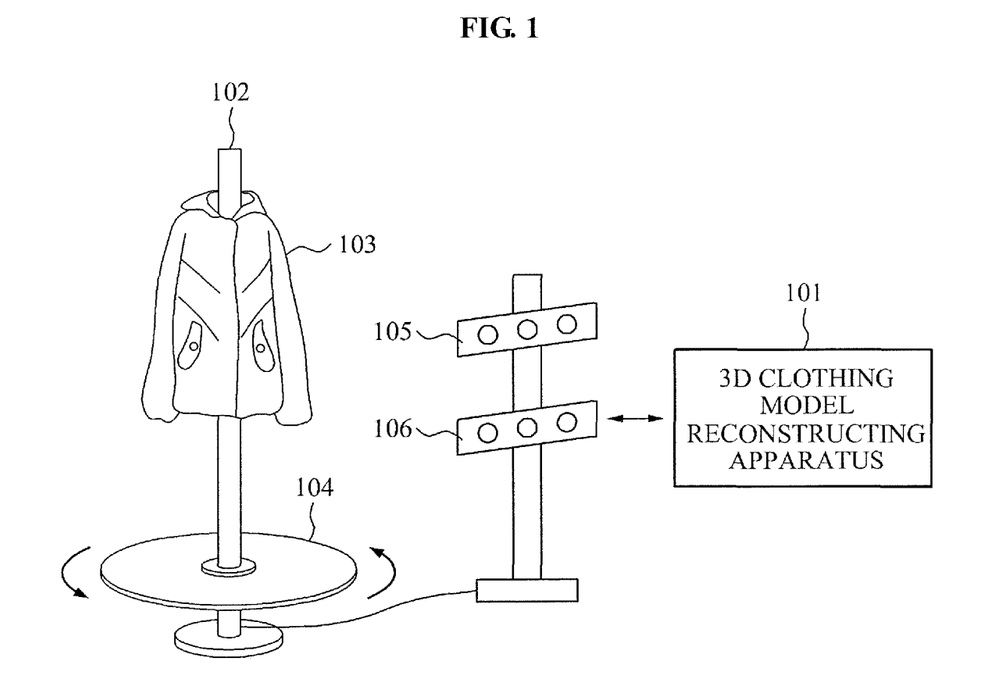
FIG. 1 is a diagram illustrating an overall three-dimensional (3D) clothing model reconstructing apparatus according to an embodiment.

FIG. 1 is a diagram illustrating an overall three-dimensional (3D) clothing model reconstructing apparatus according to an embodiment.

Referring to FIG. 1, a mannequin 102 may wear real clothing 103 that a user desires to reconstruct. Here, the real clothing 103 may include tops such as jumpers, jackets, coats, knits, shirts and T-shirts, bottoms such as skirts and pants, dresses such as one-piece and two-piece dresses, jumpsuits such as skiwear, and accessories such as hats, neckties, mufflers, bags and shoes.

The mannequin 102 may be a shape-shifting mannequin or a general fixed-type mannequin depending on uses. For example, the mannequin 102 may include upper body, lower body and whole body mannequins, a mannequin head, a mannequin hands and a mannequin foot. The mannequin 102 may have physical body sizes adjustable by a program, for example, head size, neck size, bust size, waist size, arm size, wrist size, thigh size, calf size and foot circumference. The mannequin 102 may include a stationary mannequin used for an offline store.

The mannequin 102 wearing the clothing 103 may be disposed on a turntable 104. The turntable 104 is rotatable and may be rotated at a preset rotation angle.

A depth sensor 105 and a camera 106 may capture the clothing 103 put on the mannequin 102 positioned on the turntable 104 rotating at the rotation angle. Here, the turntable 104, the depth sensor 105 and the camera 106 may receive a signal through the 3D clothing model reconstructing apparatus 101 or a separate driving device. The turntable 104 may rotate at a preset rotation angle corresponding to the received signal, and the depth sensor 105 and the camera 106 may capture the clothing 103 put on the mannequin 102 corresponding to the received signal. Here, relative positions of the turntable 104, the depth sensor 105 and the camera 106 may be identified by a camera calibration method.

Further, when the signal is received, heights and directions of the depth sensor 105 and the camera 106 may be set to capture the clothing 103 put on the mannequin 102. Here, the heights and directions of the depth sensor 105 and the camera 106 may be fixed, in which case a process of setting up the heights and directions may be omitted.

The 3D clothing model reconstructing apparatus 101 may capture image information on the clothing 103 put on the mannequin 102 through the depth sensor 105 and the camera 106. Here, the 3D clothing model reconstructing apparatus 101 may capture the image information on the clothing 103 put on the mannequin 102 corresponding to the rotation angle of the turntable 104, thereby capturing the image information on the clothing 103 at each rotation angle.

The 3D clothing model reconstructing apparatus 101 may generate a temporary model based on the captured image information. Here, the temporary model may include geometry information and texture information on the clothing based on the captured image information. The 3D clothing model reconstructing apparatus 101 may generate a final clothing model using the temporary model. The clothing model is a 3D model of the clothing put on the mannequin 102, which may include a draped form of the clothing.

The 3D clothing model reconstructing apparatus 101 may provide a current reconstruction status of the clothing through a user interface (UI). The 3D clothing model reconstructing apparatus 101 may visualize a process of generating the clothing model corresponding to the clothing in real time, thereby improving accuracy of the clothing model.

Figure 2:
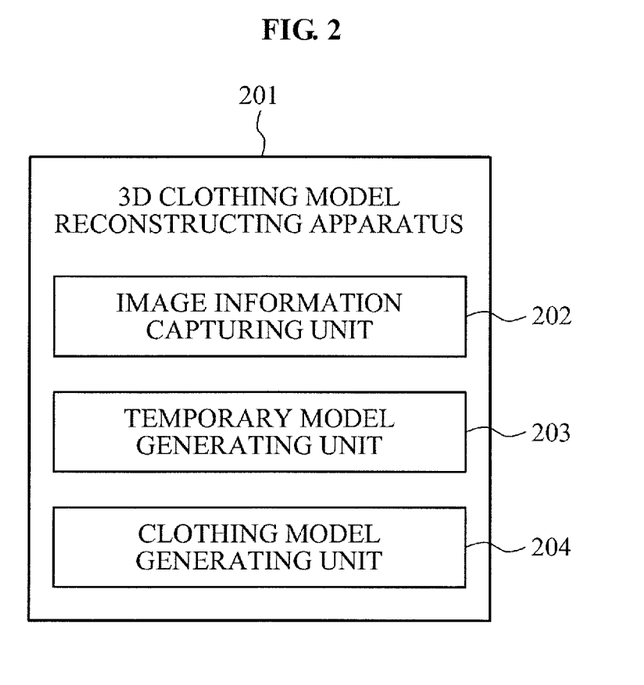
FIG. 2 illustrates a detailed configuration of a 3D clothing model reconstructing apparatus according to an embodiment.

FIG. 2 illustrates a detailed configuration of a 3D clothing model reconstructing apparatus according to an embodiment.

Referring to FIG. 2, the 3D clothing model reconstructing apparatus 201 may include an image information capturing unit 202, a temporary model generating unit 203 and a clothing model generating unit 204.

The image information capturing unit 202 may capture image information on clothing put on a mannequin. The image information capturing unit 202 may capture the image information on the clothing put on the mannequin positioned on a turntable based on a rotation angle of the turntable. In detail, the image information capturing unit 202 may capture the image information by rotation angle on the clothing put on the mannequin rotating at the same angle as that of the rotating turntable.

Here, as the captured image information may include a measurement noise generated when captured and a background, the measurement noise may be minimized and the background may be removed. A configuration for removing the measurement noise from the captured image information will be described in detail with reference to FIG. 3.

The temporary model generating unit 203 may generate a temporary model including geometry information and texture information on the clothing using the captured image information. In detail, the temporary model generating unit 203 may generate the geometry information on the clothing using depth information included in the captured image information. The temporary model generating unit 203 may calculate a 3D spatial position using the depth information included in the captured image information and generate the geometry information on the clothing in a 3D mesh form corresponding to the calculated position.

The temporary model generating unit 203 may remove the mannequin from the geometry information on the clothing. The temporary model generating unit 203 may remove part of the clothing when removing the mannequin. Thus, the temporary model generating unit 203 may reconstruct the removed part of the clothing using a hole filling technique, which will be described in detail with reference to operation 403 of FIG. 4.

The temporary model generating unit 203 may include the texture information mapped with the geometry information on the clothing using color information included in the captured image information. In detail, the temporary model generating unit 203 may extract texture coordinates of each vertex by two-dimensional parameterization of the temporary model. Here, the temporary model generating unit 203 may remove a lighting effect from the captured image information, which will be described in detail with reference to operation 405 of FIG. 4.

The temporary model generating unit 203 may render the extracted texture coordinates in a 2D space to be mapped with a 3D mesh of the geometry information, thereby extracting a 3D space mapped with each texel of texture. The temporary model generating unit 203 may conduct a visibility test with a virtual position of the captured image information in the mapped space in order to determine a color of each texel and determine a texel value based on recorded color information.

Figure 3:
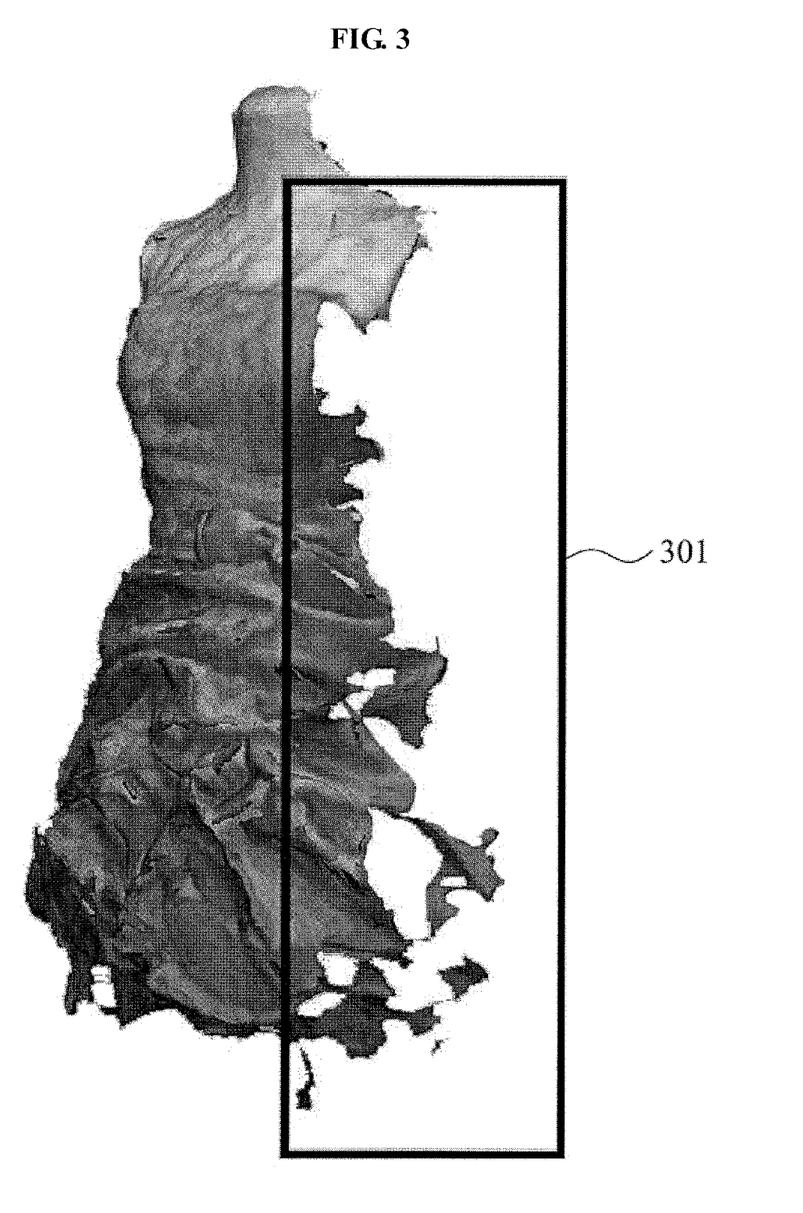
FIG. 3 illustrates a process of generating a temporary model according to an embodiment.

The temporary model generating unit 203 may generate the temporary model including the geometry information and the texture information on the clothing generated by the foregoing processes. The temporary model generating unit 203 may provide the generated temporary model to users via a viewer. For instance, the temporary model generating unit 203 may provide the temporary model through a UI of a display 301, as shown in FIG. 3. A detailed configuration will be described with reference to FIG. 3.

Here, the image information capturing unit 202 and the temporary model generating unit 203 may operate sequentially. That is, the image information capturing unit 202 and the temporary model generating unit 203 may remove noise and a background from one captured image information in real time and generate a temporary model, instead of capturing the image information on the clothing, removing noise and a background from captured image information and generating the temporary model all at once. That is, a process that when a temporary model with respect to one image information is generated, the image information capturing unit 202 re-captures the image information on the clothing rotated at the rotation angle of the turntable and removes noise and a background and the temporary model generating unit 203 generates a temporary model may be repeatedly carried out.

That is, the 3D clothing model reconstructing apparatus 201 may continually generate the temporary model with respect to the image information by sequentially manipulating the angle of the turntable and directions of a depth sensor and a camera.

Here, the temporary model may be formed of partial 3D patch data with respect to geometry information corresponding to captured image information at each rotation angle of the turntable. That is, the temporary model, which may not be a complete model form for use, may include separate 3D patch data not connected and be inappropriate for a simulation on an avatar. Therefore, the temporary model may need to be subjected to a use process to have an appropriate form for a simulation.

Thus, the temporary model generating unit 203 may form unconnected temporary models into a combined temporary model. In detail, the temporary model may be formed of partial 3D patch data to include reliability of the data by measured point of the 3D patch data. Here, the measured point of the 3D patch data may refer to a location point of the clothing captured at each rotation angle of the turntable. That is, the measured point of the 3D patch data may become a reference point for measuring a variation by the depth sensor.

The temporary model generating unit 203 may conduct accumulation and addition with respect to voxels present in a predetermined area, such as a sphere with a certain radius, from the measured point of the 3D patch data. That is, the temporary model generating unit 203 may accumulate and add a value obtained by multiplying a relative distance value at a 3D position of the camera acquiring the 3D patch data by reliability of the temporary model to the voxels present in the predetermined area.

Here, the voxels present in the predetermined area may generate 3D rays from the individual voxels to a starting point of the camera, and relative distance values of the respective voxels may be calculated using the generated rays. The relative distance values may refer to a difference between a distance from the starting point of the camera to the voxels and a distance from the starting point of the camera to a measured point on 3D patch crossing the rays. The relative distance values may have a positive value when the voxels are closer to the starting point of the camera than the measured point on the patch is, while the relative distance values may have a negative value as the voxels become farther from the starting point of the camera. The voxels may accumulate relative distance values with respect to 3D patch data obtained by each camera.

The temporary model generating unit 203 may record information on a 3D measured point measured in each patch and a reliability value in a voxel involved in crossing using the 3D patch data and inter-voxel spatial crossing information. When measured points and reliabilities through crossing of 3D patch data obtained in capturing the image information on the clothing are collected with respect to all voxels, the temporary model generating unit 203 may generate the geometry information in one integrated 3D mesh form using collected voxel information. Here, the temporary model generating unit 203 may generate the geometry information in the 3D mesh form, thereby generating one combined temporary model.

The clothing model generating unit 204 may generate a clothing model corresponding to the clothing using the temporary model. In detail, the clothing model generating unit 204 may hierarchically transform the temporary model to express a form based on a clothing movement, thereby generating the clothing model. That is, the real clothing may have various forms. The real clothing may be made in a single layer or a plurality of layers or have accessories attached, such as ribbon, lace, a brooch and beads. In this case, since it is generally difficult to distinguish the respective layers, the clothing model may be reconstructed based on an outermost layer. This reconstructed clothing model may involve a substantial difference between a simulated clothing movement and a real clothing movement. Thus, the clothing model generating unit 204 may hierarchically transform the clothing so as to minimize the movement difference, thereby generating the clothing model.

The clothing model generating unit 204 may restructure a texture of the temporary model based on a structural property of the texture for expressing the clothing to generate the clothing model. The clothing model generating unit 204 may extract an outline of the temporary model by height to express a natural clothing texture when simulating the clothing model and restructure the texture of the temporary model according to the clothing texture based on the extracted outline.

The clothing model generating unit 204 may adjust a size of each part of the mannequin to reflect physical properties including at least one of an allowable body size of the clothing by part and elasticity of the clothing, thereby generating the clothing model.

The clothing model generating unit 204 may generate the clothing model by simplifying the temporary model by pattern unit in view of a degree of precision of the temporary model. The clothing model generating unit 204 may phase the temporary model to simplify the degree of precision in order to simulate the clothing model in real time.

The 3D clothing model reconstructing apparatus may be a device which digitalizes real clothing into a clothing model to generate the clothing model corresponding to the clothing to be applied to a simulation which enables a user to experience matching or fitting degree to the clothing without directly trying on the clothing.

The 3D clothing model reconstructing apparatus may transform in stages the temporary model, generated based on the image information obtained by capturing the clothing, to be appropriate for a simulation, thereby enhancing realism as compared with a conventionally digitalized clothing model.

FIG. 3 illustrates a process of generating a temporary model according to an embodiment.

Referring to FIG. 3, captured image information may include measurement noise and a background which may occur when captured. In the captured image information, the measurement noise may be minimized by a noise reducing method and the background may be removed.

The noise reducing method may be conducted based on probability according to accuracy of the captured image information. That is, the captured image information may be captured along with neighboring image information 301 based on a measured point of the captured image information as clothing is captured according to a rotation angle of a turntable. Here, the captured neighboring image information 301 is not obtained from a center of a depth sensor and thus may have insufficient accuracy as image information for reconstructing the clothing.

That is, the captured neighboring image information 301 may be an error caused by a characteristic of the depth sensor. For example, the neighboring image information 301 may be an image of a hem of the clothing as shown in FIG. 3.

Thus, the captured image information may have reliability of measured data set to be low when a variation in a depth direction of a camera obtained with respect to measured 3D data around an individual interest measured point at the rotation angle of the turntable is great. The captured image information may be generated into a clothing model having a single plate shape based on the set reliability.

Figure 4:
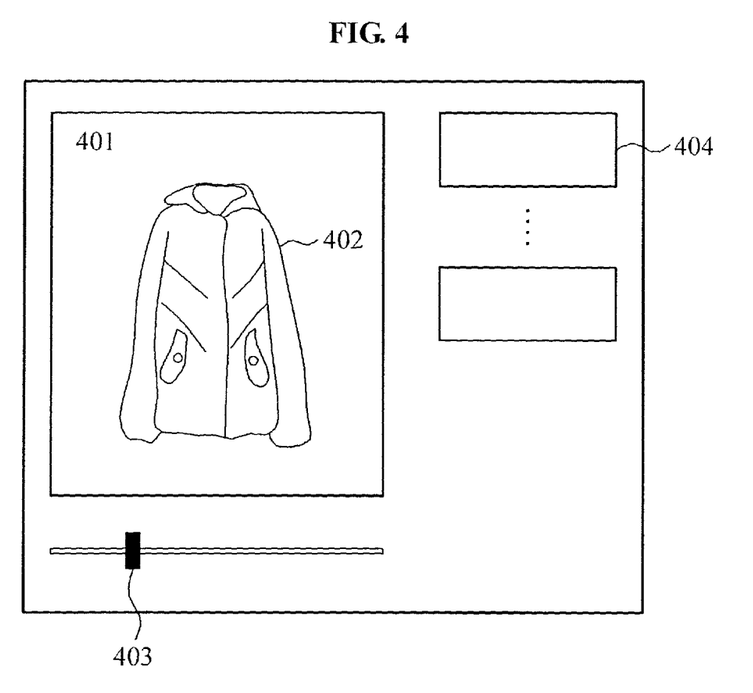
FIG. 4 illustrates a UI of a display of a 3D clothing model reconstructing apparatus according to an embodiment.

FIG. 4 illustrates a UI of a display of a 3D clothing model reconstructing apparatus according to an embodiment.

Referring to FIG. 4, the 3D clothing model reconstructing apparatus may provide clothing 402 through the UI of the display 401. The 3D clothing model reconstructing apparatus may provide a user in real time with a temporary model generated corresponding to captured image information. The 3D clothing model reconstructing apparatus may visualize the temporary model in real time, thereby providing the user with progress of digitalization of the clothing.

Furthermore, the 3D clothing model reconstructing apparatus may provide a final clothing model using the clothing model through the UI of the display 401. Here, the user may identify the completed clothing model at any angle using a UI tool 403. If an additional operation is necessary with respect to the final model, the user may select a corresponding part using the UI tool 403 and conduct a scanning operation on the image information on the clothing partly by manipulating a manipulation tool 404.

That is, the 3D clothing model reconstructing apparatus may conduct an additional scanning operation with respect to the completely reconstructed clothing model through the UI of the display 401. The 3D clothing model reconstructing apparatus may include an accumulation technology for accumulating a temporary model generated through the additional scanning operation.

In detail, the 3D clothing model reconstructing apparatus may have a structure of adding the temporary model generated through the additional scanning operation to the completed clothing model. That is, the 3D clothing model reconstructing apparatus may partition a space for the clothing so as to conveniently add the temporary model generated through the additional scanning operation and add the temporary model generated through the additional scanning operation by utilizing the partitioned space. That is, the 3D clothing model reconstructing apparatus may partition the space for the clothing and allocate the temporary model associated with the partitioned space to conduct processing by space unit.

Here, the 3D clothing model reconstructing apparatus may generate an additional temporary model by repeating operations of capturing image information on the clothing and generating geometry information on the clothing based on the captured image information.

The 3D clothing model reconstructing apparatus may employ a voxel-based data processing technique of equally partitioning a space. That is, the 3D clothing model reconstructing apparatus may define clothing to reconstruct into a digital form as a 3D space. The 3D clothing model reconstructing apparatus may partition the defined space equally into specific voxel sizes to represent a 3D space using a voxel with a uniform size. The 3D clothing model reconstructing apparatus may allocate the temporary model by space unit based on 3D space information with respect to the voxel with the uniform size. The 3D clothing model reconstructing apparatus may allocate the temporary model by space unit to generate the clothing model.

The 3D clothing model reconstructing apparatus may allocate the temporary model generated through the additional scanning operation corresponding to a space unit which requires an additional scanning operation, thereby accumulating the clothing model.

Thus, when the temporary mode generated through the additional scanning operation is added, the 3D clothing model reconstructing apparatus may not change all data included in the clothing model but change data in a space involved in a change based on a space unit, thereby improving processing efficiency.

Figure 5:
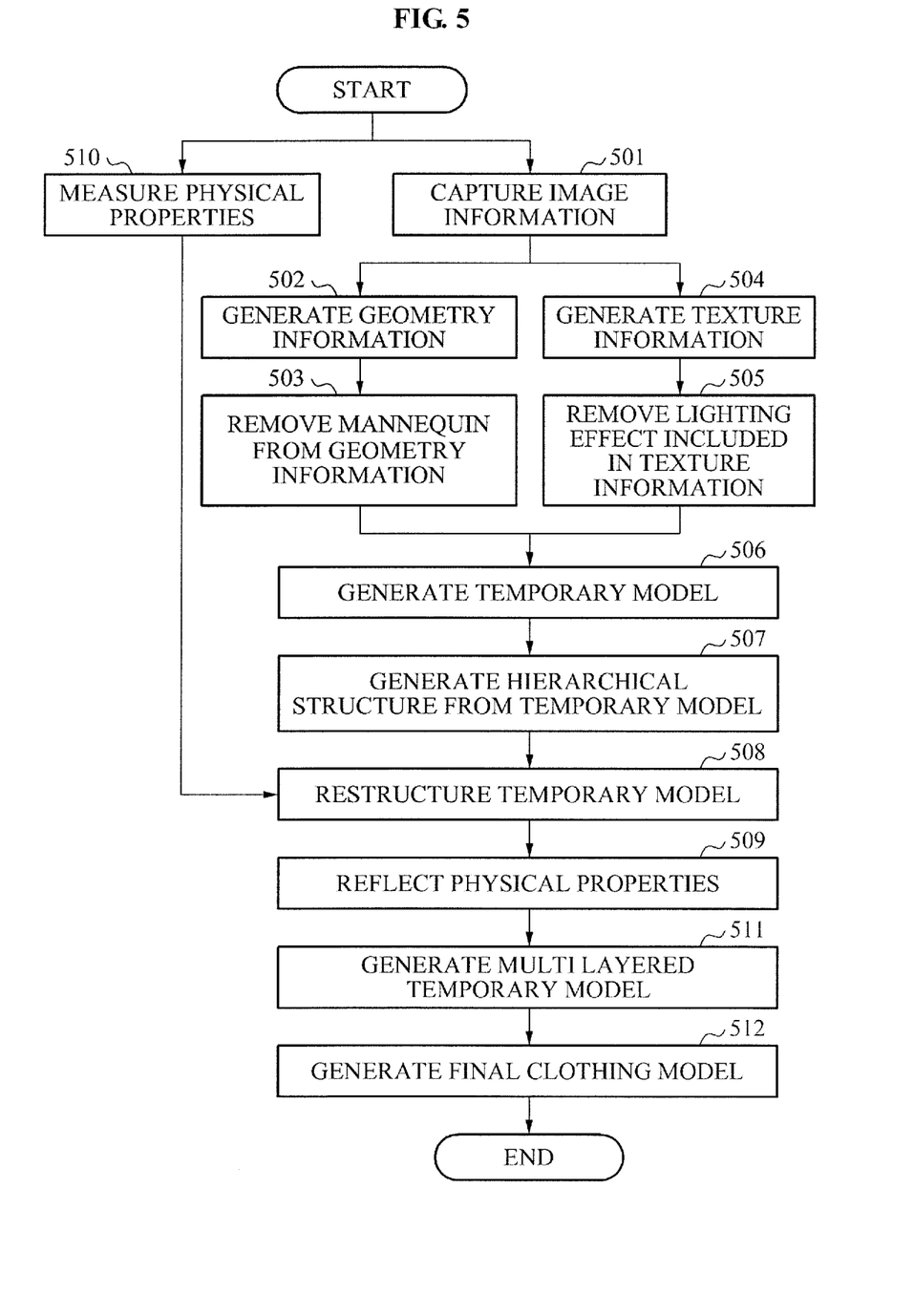
FIG. 5 illustrates a 3D clothing model reconstructing method according to an embodiment.

FIG. 5 illustrates a 3D clothing model reconstructing method according to an embodiment.

In operation 501, a 3D clothing model reconstructing apparatus may capture image information on clothing put on a mannequin positioned on a turntable based on a rotation angle of the turntable. Here, measurement noise and a background, which are generated when the image information is captured, may be removed from the captured image information on the clothing. Here, the image information on the clothing may include reliability based on accuracy of data.

In operation 502, the 3D clothing model reconstructing apparatus may generate geometry information on the clothing using depth information of the captured image information. In detail, the 3D clothing model reconstructing apparatus may calculate a 3D spatial position using the depth information included in the captured image information and generate the geometry information on the clothing in a 3D mesh form corresponding to the calculated position.

In operation 503, the 3D clothing model reconstructing apparatus may remove the mannequin from the geometry information on the clothing. Here, although the mannequin is used to maintain shape of the clothing, the mannequin is necessarily removed from a reconstructed clothing model. Thus, the 3D clothing model reconstructing apparatus may extract information on the mannequin in advance and remove the mannequin corresponding to the extracted information.

For example, the 3D clothing model reconstructing apparatus employ a method of producing the mannequin in specific color and removing the mannequin of the specific color when generating the clothing model. This method is referred to as chroma keying that is used in special effect cinematography for movies and dramas. When chroma keying is employed, mannequins manufactured in various colors depending on clothing colors are needed.

Alternatively, the 3D clothing model reconstructing apparatus may reconstruct a 3D model corresponding to the mannequin before the clothing model is generated. The 3D clothing model reconstructing apparatus may remove the 3D model of the mannequin, manufactured in advance when the clothing model is generated, from a temporary model, thereby removing the mannequin. This method involves matching a position and direction of the mannequin reconstructed in advance with a position and direction of the mannequin wearing the clothing.

Alternatively, the 3D clothing model reconstructing apparatus may remove the mannequin by comparing images using the depth information and color information of the image information. That is, the 3D clothing model reconstructing apparatus may project a temporary model into 2D image information. The 3D clothing model reconstructing apparatus may compare the projected image information with the captured image information to minimize a difference between the projected image information with the captured image information, thereby removing the mannequin.

Here, when tightness of the clothing to the mannequin is high, part of the clothing may be removed together with the mannequin to cause a hole when the 3D clothing model reconstructing apparatus removes the mannequin. Here, tightness of the clothing to the mannequin may be determined on material quality and elasticity of the clothing. That is, when the clothing has a high-elasticity material and, tightness of the clothing to the mannequin may be high. When the clothing has a low-elasticity material, tightness of the clothing to the mannequin may be low. For example, when the clothing is an elastic tight T-shirt, tightness of the clothing to the mannequin is high. The clothing may also be removed depending on tightness of the clothing to the mannequin when the mannequin is removed, because tightness of the clothing to the mannequin is higher than an error in a technique of removing the mannequin.

The 3D clothing model reconstructing apparatus may reconstruct the removed part of the clothing using a hole filling technique. That is, the 3D clothing model reconstructing apparatus may expanding a surface from an edge of the hole determined as the removed part of the clothing to the hole in view of a curvature in a surface direction, thereby reconstructing the removed part of the clothing.

The 3D clothing model reconstructing apparatus may compare the captured image information and a temporary model to identify whether the removed part is formed on purpose or due to an error.

Alternatively, the 3D clothing model reconstructing apparatus may produce the mannequin using materials not detectable by a depth sensor to remove the mannequin. A kinect uses a method of projecting an infrared pattern onto an object and detecting a reflected pattern using an infrared sensor. Here, if a pattern includes a black specific material, the kinect does not detect the material since the pattern is absorbed. Accordingly, the 3D clothing model reconstructing apparatus may produce the mannequin using materials not detected by the kinect using such a characteristic, thereby conveniently removing the mannequin.

In operation 504, the 3D clothing model reconstructing apparatus may generate texture information using color information include in the captured image information on the clothing.

In operation 505, the 3D clothing model reconstructing apparatus may remove lighting information included in the color information. The 3D clothing model reconstructing apparatus may remove the lighting information from the color information included in the captured image information to bring realism to the clothing model. The 3D clothing model reconstructing apparatus may employ a relighting method of adding the removed lighting information when a finally generated clothing model is simulated For example, the 3D clothing model reconstructing apparatus may apply the same intensity of lighting in all directions of the clothing and remove effects depending on a position and shape of the lighting in advance.

Alternatively, the 3D clothing model reconstructing apparatus may set an initial position and intensity of lighting at random and conduct realistic rendering using geometry information on the temporary model. The 3D clothing model reconstructing apparatus may compare a rendering result with the color information included in the captured image information to adjust the set position and intensity of the lighting. The 3D clothing model reconstructing apparatus may repeat a comparing operation until a pixel-unit difference between the rendering result and the color information included in the captured image information is a specific value or smaller.

In operation 506, the 3D clothing model reconstructing apparatus may generate a temporary model. Here, the 3D clothing model reconstructing apparatus may generate the temporary model as a result of conducting operations 402 to 405.

In operation 507, the 3D clothing model reconstructing apparatus may generate a hierarchical structure from the temporary model. In detail, the 3D clothing model reconstructing apparatus may generate the hierarchical structure from the temporary model to minimize a difference between a simulated clothing movement and a real clothing movement.

For example, the 3D clothing model reconstructing apparatus may generate a clothing model of ruffled clothing, such as a flamenco dress. Here, the 3D clothing model reconstructing apparatus may distinguish general movements of the flamenco dress and specific movements in the general movements and model these movements in phases to generate a hierarchical structure. The 3D clothing model reconstructing apparatus may generate the hierarchical structure with a first phase of expressing no ruffle on the flamenco dress and a second phase of expressing ruffles on the dress. The 3D clothing model reconstructing apparatus may bind the phases based on an initial shape of the clothing on the basis of each phase to represent the ruffles of the flamenco dress.

Further, the 3D clothing model reconstructing apparatus may stick an accessory such as ribbon to another part when the accessory is relocated by a simulation. In this case, the 3D clothing model reconstructing apparatus does not acquire in advance hidden image information at a position before relocation, and thus a hole may be generated. Here, the 3D clothing model reconstructing apparatus may fill the hole formed by relocation of the accessory using a hole filling technique.

In operation 508, the 3D clothing model reconstructing apparatus may generate a clothing model by restructuring a texture of the temporary model based on a structural property of the texture for expressing the clothing. In a general mass-spring-based simulation, modeling may be carried out using a vertex as mass and an edge as spring. Here, if a mass-spring method is applied to the temporary model including the geometry information, it is difficult to obtain a desired simulation result due to structural differences of the real clothing.

Thus, the 3D clothing model reconstructing apparatus may extract an outline of the temporary model by height to express a natural clothing texture when simulating the clothing model and restructure the texture of the temporary model according to the clothing texture based on the extracted outline.

In operation 509, the 3D clothing model reconstructing apparatus may adjust a size of each part of the mannequin to reflect physical properties including at least one of an allowable body size of the clothing by part and elasticity of the clothing, thereby generating the clothing model.

That is, the 3D clothing model reconstructing apparatus may measure physical properties of the clothing using the mannequin. The 3D clothing model reconstructing apparatus may adjust a size of the mannequin by part, such as a bust size and a waist size, and measure the allowable body size of the clothing to reconstruct by part and elastic of the clothing in operation 510. The measured physical properties may be converted into values applicable to springs of a mass-spring model and be available to a simulation.

In operation 511, the 3D clothing model reconstructing apparatus may simplify the temporary model using a plurality of degrees of precision. The 3D clothing model reconstructing apparatus may generate a temporary model with a low degree of precision or a temporary model with a high degree of precision in view of computing performance of a terminal using the temporary model. That is, the 3D clothing model reconstructing apparatus may generate a temporary model with a low degree of precision when a simulation or visualization is needed as compared with the computing performance of the terminal. On the contrary, the 3D clothing model reconstructing apparatus may generate a temporary model with a high degree of precision when an elaborate and realistic simulation is needed.

For example, the 3D clothing model reconstructing apparatus may simplify the temporary model by using an edge collapsing method of selecting one edge, generating a vertex with a simplistic operation error minimized on the edge, and moving two vertices connected to the edge to a position of the generated vertex to become a single vertex.

Alternatively, the 3D clothing model reconstructing apparatus may conduct a simplistic operation based on a pattern unit considering that a structure of the temporary model has a regularly repeated pattern. Further, the 3D clothing model reconstructing apparatus may minimize an appearance change by allocating lower priorities to simplistic operation candidates disposed at positions which have substantial effect to a silhouette of the temporary model in a simplistic operation than to other candidates.

In operation 512, the 3D clothing model reconstructing apparatus may generate the final clothing model corresponding to the clothing as a result of conducting operations 407 to 411 using the temporary model.

The 3D clothing model reconstructing apparatus may use a voxel-based data processing technique of equally partitioning a space.

The 3D clothing model reconstructing apparatus may re-generate the clothing model by utilizing distribution of data stored in a space including the clothing model and mutual position information between spaces. Distribution of data may be expressed in various ways, such as a binary method only considering existence of data in a space and a method considering a distance between a space and a model surface. A representative method of generating a 3D model using these kinds of information may include marching cubes.

Here, the temporary model with the part of the clothing reconstructed may be represented in a form of clothing through a hole filling technique but decrease visualization needed for a clothing experience service and performance of a clothing simulation due to many vertices. Accordingly, the 3D clothing model reconstructing apparatus may reduce complexity of the reconstructed temporary model and optimize the temporary model to be suitable for a simulation.

As described above, a 3D clothing model reconstructing method and a 3D clothing model reconstructing apparatus may use image information acquired from real clothing put on a mannequin without any clothing pattern when generating a 3D clothing model to simplify a process of 3D-reconsructing clothing, thereby generating a 3D clothing model using minimized time and costs.

A 3D clothing model reconstructing method and a 3D clothing model reconstructing apparatus may acquire image information on clothing put on a mannequin disposed on a turntable which rotates at a rotation angle of the turntable, thereby acquiring the image information on the clothing at different angles and minimizing user intervention.

A 3D clothing model reconstructing method and a 3D clothing model reconstructing apparatus may automatically extract physical information on clothing to generate a clothing model without any clothing pattern.

The foregoing methods according to the exemplary embodiments of the present invention may be recorded in non-transitory computer-readable media including program instructions to implement various operations embodied by a computer. The media may also include, alone or in combination with the program instructions, data files, data structures, and the like. The program instructions recorded in the media may be designed and configured specially for the present invention or be known and available to those skilled in computer software.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention.

Therefore, the scope of the present invention is not limited to the foregoing exemplary embodiments but is defined by the claims and their equivalents.

What is claimed is:

1. A three-dimensional (3D) clothing model reconstructing method, the method comprising:
   capturing image information on clothing put on a mannequin;
   generating a temporary model comprising geometry information and texture information on the clothing using the captured image information, wherein the generating extracts texture coordinates of each vertex by two-dimensional parameterization of the temporary model; and
   generating a clothing model corresponding to the clothing using the temporary model, wherein the clothing model expresses a form based on a clothing movement.

2. The method of claim 1, wherein the capturing captures the image information on the clothing put on the mannequin disposed on a turntable based on a rotation angle of the turntable.

3. The method of claim 1, wherein the generating of the temporary model calculates a 3D spatial position using depth information comprised in the captured image information and comprises the geometry information on the clothing in a 3D mesh form corresponding to the calculated position.

4. The method of claim 1, wherein the generating of the temporary model comprises the texture information mapped with the geometry information on the clothing using color information comprised in the captured image information.

5. The method of claim 1, wherein the generating of the temporary model generates the temporary model by removing the mannequin from geometry information on the temporary model and by removing lighting information comprised in the texture information.

6. The method of claim 1, wherein the generating of the temporary model generates the temporary model based on spatial information on the temporary model and mutual position information according to 3D spatial information on the clothing.

7. The method of claim 1, wherein the generating of the clothing model generates the clothing model by hierarchically transforming the temporary model to express a form based on a clothing movement.

8. The method of claim 1, wherein the generating of the clothing model generates the clothing model by reconstructing a texture of the temporary model based on a structural property of the texture for expressing the clothing.

9. The method of claim 1, wherein the generating of the clothing model generates the clothing model by adjusting a size of each part of the mannequin to reflect physical properties comprising at least one of an allowable body size of the clothing by part and elasticity of the clothing.

10. The method of claim 1, wherein the generating of the clothing model generates the clothing model by simplifying the temporary model by pattern unit in view of preciseness of the temporary model.

11. A three-dimensional (3D) clothing model reconstructing apparatus, the apparatus comprising:
- an image information capturer to capture image information on clothing put on a mannequin;
- a temporary model generator to generate a temporary model comprising geometry information and texture information on the clothing using the captured image information, wherein the temporary model generator extracts texture coordinates of each vertex by two-dimensional parameterization of the temporary model; and
- a clothing model generator to generate a clothing model corresponding to the clothing using the temporary model.

12. The apparatus of claim 11, wherein the image information capturer captures the image information on the clothing put on the mannequin disposed on a turntable based on a rotation angle of the turntable.

13. The apparatus of claim 11, wherein the temporary model generator calculates a 3D spatial position using depth information comprised in the captured image information and comprises the geometry information on the clothing in a 3D mesh form corresponding to the calculated position.

14. The apparatus of claim 11, wherein the temporary model generator comprises the texture information mapped with the geometry information on the clothing using color information comprised in the captured image information.

15. The apparatus of claim 11, wherein the temporary model generator generates the temporary model by removing the mannequin from geometry information on the temporary model and by removing lighting information comprised in the texture information.

16. The apparatus of claim 11, wherein the temporary model generator generates the temporary model based on spatial information on the temporary model and mutual position information according to 3D spatial information on the clothing.

17. The apparatus of claim 11, wherein the clothing model generator generates the clothing model by hierarchically transforming the temporary model to express a form based on a clothing movement.

18. The apparatus of claim 11, wherein the clothing model generator generates the clothing model by reconstructing a texture of the temporary model based on a structural property of the texture for expressing the clothing.

19. The apparatus of claim 11, wherein the clothing model generator generates the clothing model by adjusting a size of each part of the mannequin to reflect physical properties comprising at least one of an allowable body size of the clothing by part and elasticity of the clothing.

20. The apparatus of claim 11, wherein the clothing model generator generates the clothing model by simplifying the temporary model by pattern unit in view of preciseness of the temporary model.

* * * * *